US008427785B2

United States Patent
Ooeda et al.

(10) Patent No.: US 8,427,785 B2
(45) Date of Patent: Apr. 23, 2013

(54) HEAD-SLIDER INCLUDING A LOW-SURFACE-ENERGY FILM THAT PREVENTS LUBRICANT ACCUMULATION, HEAD-ARM ASSEMBLY INCLUDING THE HEAD-SLIDER, AND HARD-DISK DRIVE INCLUDING THE HEAD-ARM ASSEMBLY

(75) Inventors: Yoshihiko Ooeda, Kanagawa (JP);
Kenji Kuroki, Kanagawa (JP);
Katsuhide Tanaka, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 363 days.

(21) Appl. No.: 12/639,013

(22) Filed: Dec. 16, 2009

(65) Prior Publication Data
US 2010/0149693 A1 Jun. 17, 2010

(30) Foreign Application Priority Data
Dec. 16, 2008 (JP) ................................ 2008-320247

(51) Int. Cl.
*G11B 5/60* (2006.01)
(52) U.S. Cl.
USPC ..................................... 360/236.5; 360/235.7
(58) Field of Classification Search ............... 360/235.2, 360/235.3, 235.7, 236.5, 237.1, 235.1
See application file for complete search history.

(56) References Cited

U.S. PATENT DOCUMENTS

| | | | | |
|---|---|---|---|---|
| 6,477,011 B1 * | 11/2002 | Hsiao et al. | ................ | 360/235.1 |
| 6,661,621 B1 * | 12/2003 | Iitsuka | .......................... | 360/317 |
| 7,199,982 B2 * | 4/2007 | Suk | ............................ | 360/294.7 |
| 7,460,335 B2 * | 12/2008 | Maruyama et al. | ........ | 360/235.2 |
| 7,508,632 B2 * | 3/2009 | Li et al. | ...................... | 360/235.4 |
| 2002/0089788 A1 * | 7/2002 | Baumgart et al. | ......... | 360/235.7 |
| 2009/0310257 A1 * | 12/2009 | Musashi et al. | ............ | 360/234.3 |
| 2010/0067146 A1 * | 3/2010 | Kajitani | ..................... | 360/235.4 |
| 2010/0202085 A1 * | 8/2010 | Ishii et al. | ..................... | 360/110 |
| 2012/0134045 A1 * | 5/2012 | Toyoguchi | ................. | 360/97.12 |
| 2012/0229933 A1 * | 9/2012 | Ma et al. | .................... | 360/234.1 |

FOREIGN PATENT DOCUMENTS

JP 11353839 12/1999

* cited by examiner

*Primary Examiner* — Jefferson Evans

(57) ABSTRACT

The head-slider is configured to receive an air-stream produced by rotation of a magnetic-recording disk and is configured to fly in proximity with a recording surface of the magnetic-recording disk. The head-slider includes a trailing edge on an outflow side of the air-stream, and a disk-facing surface that is configured to face the recording surface of the magnetic-recording disk. A low-surface-energy film is disposed on a portion of a trailing-edge side of the head-slider that is in contact with a boundary between the trailing edge and the disk-facing surface. The low-surface-energy film has a lower surface energy than other portions of the trailing-edge side where the low-surface-energy film is not disposed.

11 Claims, 4 Drawing Sheets

HEAD-SLIDER INCLUDING A LOW-SURFACE-ENERGY FILM THAT PREVENTS LUBRICANT ACCUMULATION, HEAD-ARM ASSEMBLY INCLUDING THE HEAD-SLIDER, AND HARD-DISK DRIVE INCLUDING THE HEAD-ARM ASSEMBLY

CROSS-REFERENCE TO RELATED APPLICATION

This application claims priority from the Japanese Patent Application No. 2008-320247, filed Dec. 16, 2008, the disclosure of which is incorporated herein in its entirety by reference.

TECHNICAL FIELD

Embodiments of the present invention relate to a head-slider, a head-arm assembly (HAA), and a hard-disk drive (HDD).

BACKGROUND

In a HDD, a head-slider, which flies above a rotating magnetic-recording disk, reads data from, and writes data to, the magnetic-recording disk. A lubricant is applied to a surface of the magnetic-recording disk in order to avoid, for instance, mechanical damage due to a contact with the head-slider, corrosion or other chemical damage, and impurity adhesion. Control of the lubricant, and the distribution and behavior of the lubricant in the HDD affect the data-storage capacity, performance, and reliability of the HDD.

Engineers and scientists engaged in HDD manufacturing and development are interested in the design of HDDs that control the lubricant, and the distribution and behavior of the lubricant in the HDD to meet the rising demands of the marketplace for increased data-storage capacity, performance, and reliability.

SUMMARY

Embodiments of the present invention include a head-slider. The head-slider is configured to receive an air-stream produced by rotation of a magnetic-recording disk and is configured to fly in proximity with a recording surface of the magnetic-recording disk. The head-slider includes a trailing edge on an outflow side of the air-stream, and a disk-facing surface that is configured to face the recording surface of the magnetic-recording disk. A low-surface-energy film is disposed on a portion of a trailing-edge side of the head-slider that is in contact with a boundary between the trailing edge and the disk-facing surface. The low-surface-energy film has a lower surface energy than other portions of the trailing-edge side where the low-surface-energy film is not disposed.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
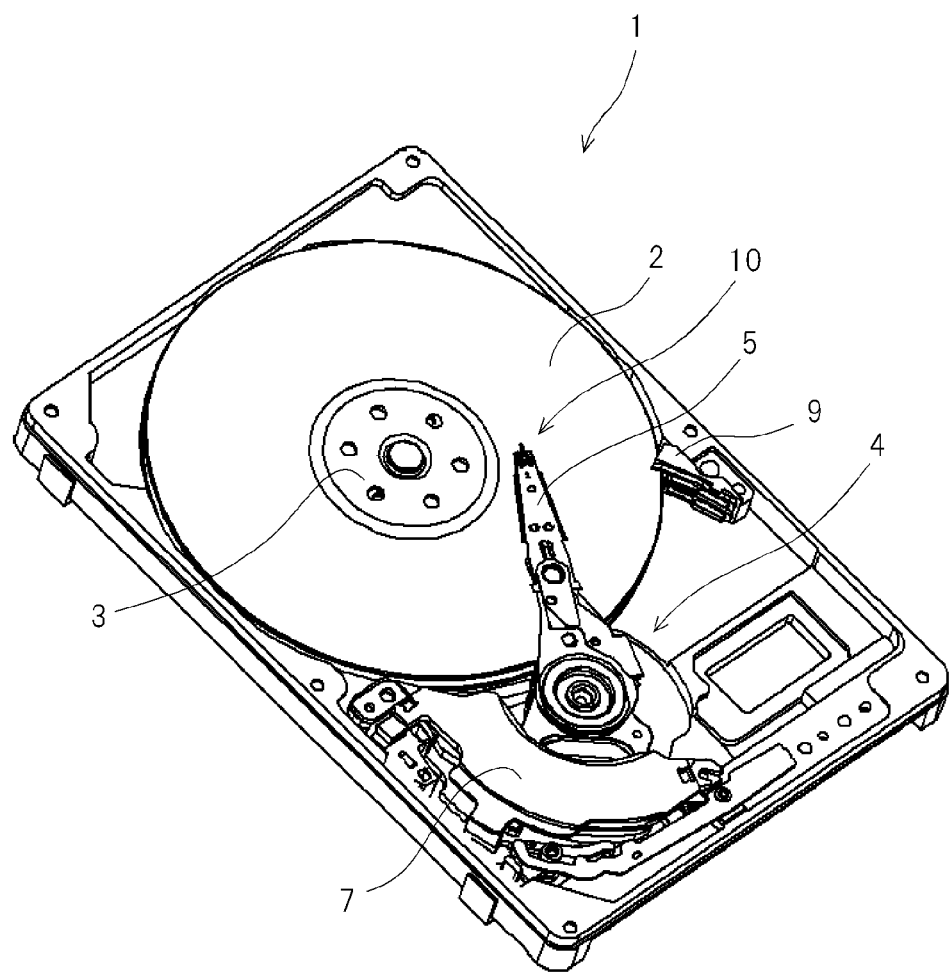
FIG. 1 is a perspective view of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Head-Slider Including a Low-Surface-Energy Film that Prevents Lubricant Accumulation, a Head-Arm Assembly Including the Head-Slider, and a Hard-Disk Drive Including the Head-Arm Assembly With relevance to embodiments of the present invention, in recent years, lubricant applied to the magnetic-recording disk adheres to the head-slider due to a decreased fly height of the head-slider, which raises the issues of control of the lubricant, and the distribution and behavior of the lubricant in the HDD.

Particularly, lubricant adhering to the head-slider is influenced by an air-stream produced by the rotation of the magnetic-recording disk and moves toward a trailing edge at the outflow side of the air-stream. As used herein, an air-stream may also include gaseous streams composed of gases other than air, so that the term of art, "air-stream," refers to a fluid-dynamic gaseous stream. Thus, the lubricant accumulated on the trailing-edge side may unexpectedly drop onto the magnetic-recording disk, while the head-slider is being loaded onto the magnetic-recording disk.

Furthermore, the lubricant accumulated on the trailing-edge side spreads over the disk-facing surface, which faces the magnetic-recording disk, while the head-slider is being unloaded from the magnetic-recording disk, which may unexpectedly increase the fly height of the head-slider at a time of subsequent loading.

As is known in the art, the whole trailing-edge side may be made to be water-repellent and oil-repellent. However, as the whole trailing-edge side then has the same surface energy, this technology may eventually allow the lubricant to accumulate on the trailing-edge side. Therefore, there exists the possibility that the lubricant may drop onto the magnetic-recording disk and spread over the disk-facing surface.

Embodiments of the present invention have been developed in view of the above circumstances. Embodiments of present invention provide a head-slider that is capable of inhibiting lubricant accumulated on the trailing-edge side from dropping onto a magnetic-recording disk and spreading over a disk-facing surface of the head-slider. Embodiments of present invention also provide a head-arm assembly (HAA) incorporating the head-slider that is capable of inhibiting a lubricant accumulated on the trailing-edge side from dropping onto the magnetic-recording disk and spreading over the disk-facing surface. Moreover, embodiments of present invention provide a hard-disk drive (HDD) incorporating the above-described HAA.

In accordance with embodiments of the present invention, the head-slider that is configured to receive an air-stream produced by rotation of a magnetic-recording disk and is configured to fly in proximity with a recording surface of the magnetic-recording disk includes an trailing edge on the outflow side of the air-stream, and a disk-facing surface that is configured to face the recording surface of the magnetic-recording disk. In accordance with embodiments of the present invention, a low-surface-energy film is disposed on a portion of a trailing-edge side of the head-slider that is in contact with a boundary between the trailing edge and the disk-facing surface. In accordance with embodiments of the present invention, the low-surface-energy film has a lower surface energy than other portions of the trailing-edge side where the low-surface-energy film is not disposed.

In one embodiment of the present invention, the low-surface-energy film is also disposed on a portion of the trailing-edge side that is in contact with a boundary between the trailing-edge side and a lateral surface of the head-slider.

In another embodiment of the present invention, the low-surface-energy film is disposed at a distance from a terminal mounted on the trailing-edge side.

In another embodiment of the present invention, the low-surface-energy film is also disposed on a portion of the trailing-edge side that is disposed away from the boundary between the trailing-edge side and the disk-facing surface, and is extended in a width direction of the head-slider.

In another embodiment of the present invention, the low-surface-energy film is also disposed on a portion of the trailing-edge side that is disposed away from the boundary between the trailing-edge side and the lateral surface of the head-slider, and is extended in a thickness direction of the head-slider.

In another embodiment of the present invention, low-surface-energy film has a lower surface energy than the disk-facing surface of the head-slider.

In another embodiment of the present invention, the low-surface-energy film is made of a compound selected from the group consisting of a fluoride compound and a silane compound.

In another embodiment of the present invention, the head-slider further includes a heater element for displacing a write element of read-and-write elements of said head-slider toward the magnetic-recording disk.

In accordance with embodiments of the present invention, a HAA includes a suspension arm and the above-described head-slider in accord with embodiments of the present invention attached to the suspension arm.

In accordance with embodiments of the present invention, a HDD includes a magnetic-recording disk and the above-described HAA in accord with embodiments of the present invention such that the HAA includes a suspension arm and the above-described head-slider in accord with embodiments of the present invention attached to the suspension arm.

In one embodiment of the present invention, the HDD further includes a ramp for supporting the head-slider unloaded from the magnetic-recording disk.

In accordance with embodiments of the present invention, the lubricant is relatively unlikely to adhere to a portion of the trailing-edge side that is in contact with the boundary between the trailing-edge side and the disk-facing surface, and is relatively likely to adhere to another portion of the trailing-edge side. Thus, in accordance with embodiments of the present invention, the lubricant accumulated on the trailing-edge side is retained at a distance from the boundary between the trailing-edge side and the disk-facing surface, which under other circumstances might serve as a starting point for the lubricant dropping onto the magnetic-recording disk and spreading over the disk-facing surface of the head-slider. Moreover, in accordance with embodiments of the present invention, the lubricant is inhibited from accumulating on the trailing-edge side of the head-slider from where the lubricant might drop onto the magnetic-recording disk and spread over the disk-facing surface of the head-slider.

With reference now to FIG. 1, in accordance with an embodiment of the present invention, a perspective view is shown of a HDD 1. A top cover of the disk enclosure (DE) of HDD 1 is not shown in FIG. 1. A magnetic-recording disk 2 and a HAA 4 are placed within a bottom portion of the DE for HDD 1. The magnetic-recording disk 2 is installed over a spindle motor (SPM) 3, which is mounted in the bottom portion of the DE. The HAA 4 is configured to be disposed in proximity with the recording surface of the magnetic-recording disk 2 and rotatably supported for accessing the recording surface of the magnetic-recording disk 2. A suspension arm 5 is mounted at a distal end of the HAA 4. A head-slider 10 is attached to suspension arm 5 a distal end of the suspension arm 5. A voice coil motor (VCM) 7 is mounted at the end opposite the distal end of the HAA 4, opposite to where the suspension arm 5 is mounted.

HDD 1 includes a ramp 9, which is disposed close to the periphery of the magnetic-recording disk 2 to implement loading and unloading of the head-slider from the magnetic-recording disk. More specifically, when the head-slider 10 is to be unloaded from the magnetic-recording disk 2, the distal end of the suspension arm 5 runs on the ramp 9. On the other hand, when the head-slider 10 is to be loaded onto the magnetic-recording disk 2, the distal end of the suspension arm 5 slides off the ramp 9. Alternatively, a contact start stop (CSS) method may be employed for parking the head-slider 10 during times of HDD inactivity at a portion of the disk reserved for parking the head-slider 10.

Figure 2:
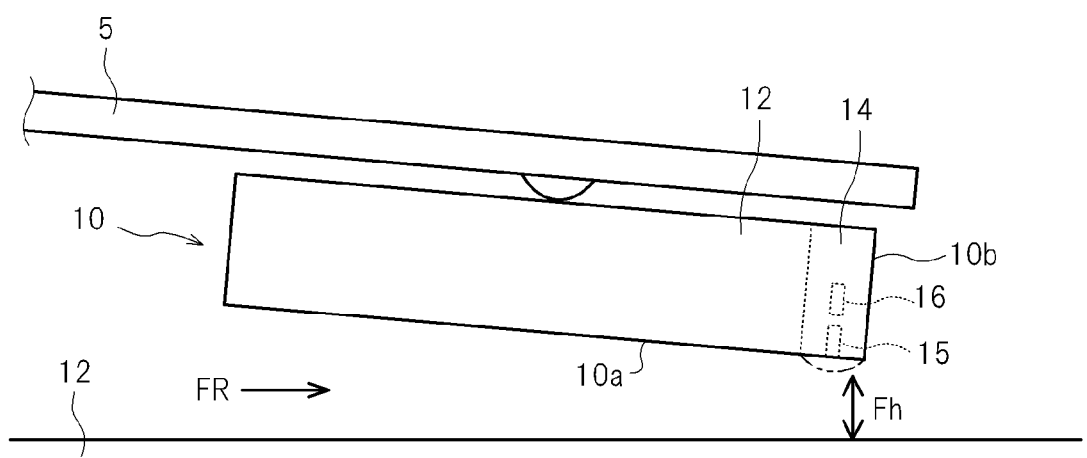
FIG. 2 is a side view of a head-slider in proximity with the recording surface of a magnetic-recording disk, in accordance with an embodiment of the present invention.

With reference now to FIG. 2, in accordance with an embodiment of the present invention, a side view of the head-slider 10 is shown as the head-slider 10 would appear when flying in proximity with the recording surface of the magnetic-recording disk 2. An air-bearing surface (ABS) is disposed on a disk-facing surface 10a of the head-slider 10. The disk-facing surface 10a faces the magnetic-recording disk 2. The head-slider 10 receives an air-stream, FR, produced by the rotation of the magnetic-recording disk 2, and flies in proximity with the recording surface of the magnetic-recording disk 2. In recent years, fly height, Fh, of the head-slider 10 has been reduced to 10 nanometers (nm) or less. Therefore, a lubricant applied to a surface of the magnetic-recording disk 2 readily adheres to the head-slider 10.

The head-slider 10 includes a slider 12, which is a sintered body made of alumina and titanium carbide and shaped like a flattened rectangular parallelepiped, and a thin-film portion 14, which is disposed on the outflow side of the air-stream FR over the slider 12 and mainly made of alumina. A magnetic-recording head is disposed within the thin-film portion 14. The thin-film portion 14 includes read-and-write elements 15 of the magnetic-recording head, which reads data from, and writes data to, the magnetic-recording disk 2, and a heater element 16, which is disposed above the read-and-write elements 15. The heater element 16 induces peripheral thermal expansion to displace the read-and-write elements 15 toward the magnetic-recording disk 2, which decreases the fly height, Fh.

The fly height, Fh, of the head-slider 10 is adjusted as is next described. A control section of HDD 1 decreases the fly height, Fh, by increasing the amount of power supplied to the heater element 16. When a contact between the read-and-write elements 15 and the magnetic-recording disk 2 is detected from a read-back signal, which is read by a read element of read-and-write elements 15, the control section determines a suitable amount of power to be supplied by the power supply compared with the prevailing power supplied. In this manner, an extremely low fly height, Fh, which is not more than 10 nm, is achieved. In this instance, the read-and-write elements 15 make contact with the magnetic-recording disk 2. Therefore, the lubricant applied to a surface of the magnetic-recording disk 2 readily adheres to the head-slider 10.

Figure 3:
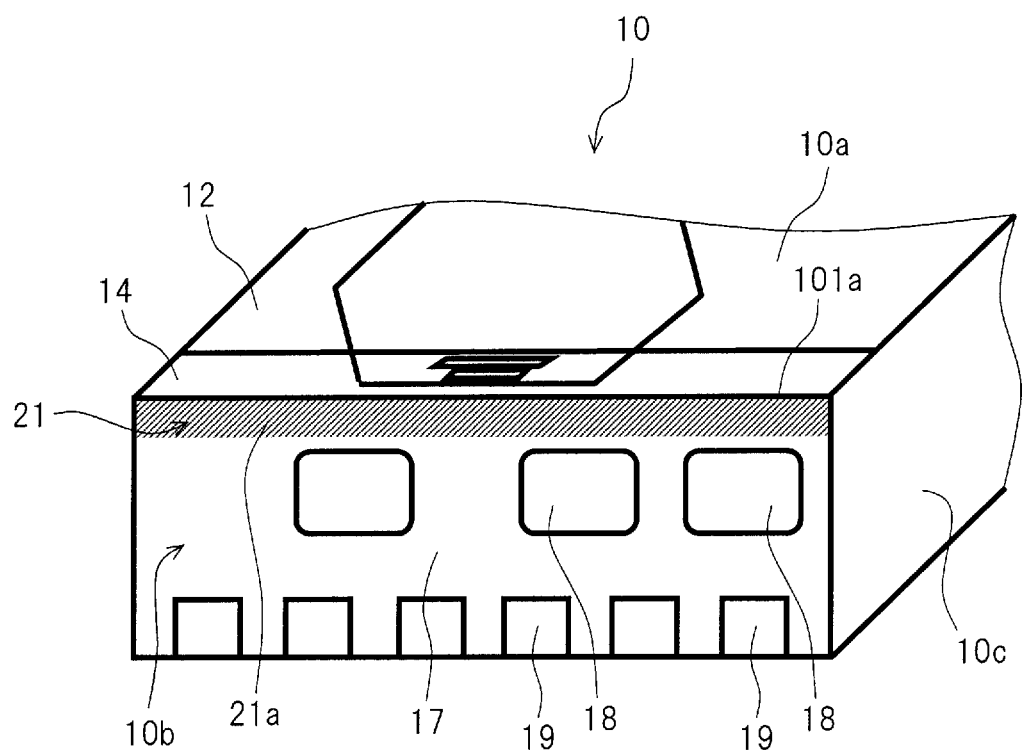
FIG. 3 is a perspective view of a trailing-edge side of the head slider illustrating disposition of a low-surface-energy film in a disk-facing boundary film portion, in accordance with an embodiment of the present invention.

With reference now to FIG. 3, in accordance with an embodiment of the present invention, a perspective view is shown of a trailing-edge side 10b of the head slider 10 that illustrates the disposition of a low-surface-energy film 21 in a disk-facing boundary film portion 21a. The head-slider 10 has a plurality of terminals 18, 19, which are mounted on the trailing-edge side 10b and are electrically connected to the read-and-write elements 15 and the heater element 16. A disk-facing-boundary film portion 21a, which is a low-surface-energy film 21, is disposed on a marginal portion of the trailing-edge side 10b that is in contact with a boundary 101a between the disk-facing surface 10a and the trailing-edge side 10b. The disk-facing-boundary film portion 21a is extended widthwise from the boundary 101a to the front of the terminals 18 close to the boundary 101a.

The low-surface-energy film 21 has a lower surface energy than the other portion of the trailing-edge side 10b, that is a non-film portion 17. The non-film portion 17 is a portion of the trailing-edge side 10b that is without the low-surface-energy film 21 and terminals 18, 19. In other words, the non-film portion 17 is a surface of the base material used in the thin-film portion 14 and has substantially the same surface energy as the disk-facing surface 10a and a lateral surface 10c.

More specifically, in accordance with embodiments of the present invention, the surface energy of the low-surface-energy film 21 is typically 30 millijoule/meter squared (mJ/m$^2$) or lower, and, in another embodiment of the present invention, 20 mJ/m$^2$ or lower. The surface energy of the non-film portion 17 is typically about 35 mJ/m$^2$ when the base material used in the thin-film portion 14 is alumina.

Forming the disk-facing-boundary film portion 21a, which serves as the low-surface-energy film 21, on a marginal portion of the trailing-edge side 10b that is in contact with the boundary 101a as described above inhibits the lubricant attached to the disk-facing surface 10a from moving to the trailing-edge side 10b.

Furthermore, even if the lubricant moves to the trailing-edge side 10b, the lubricant is retained at a distance from the boundary 101a that might serve as a starting point for the lubricant dropping onto the magnetic-recording disk 2 and spreading over the disk-facing surface 10a of the head-slider 10, because the lubricant is relatively unlikely to adhere to the disk-facing-boundary film portion 21a and is more likely to adhere to the non-film portion 17. Thus, in accordance with embodiments of the present invention, the lubricant is inhibited from: accumulating on the trailing-edge side 10b, dropping onto the magnetic-recording disk 2, and spreading over the disk-facing surface 10a.

Furthermore, in one embodiment of the present invention, the disk-facing-boundary film portion 21a may be disposed at a distance from the terminals 18. The terminals 18, which are made of Au or other metal, have a higher surface energy than the non-film portion 17. Therefore, the lubricant is very easily accumulated on the terminals 18. Therefore, if the disk-facing-boundary film portion 21a is contiguous to the terminals 18, the lubricant accumulated on the terminals 18 may drop through the disk-facing-boundary film portion 21a. Consequently, in another embodiment of the present invention, the disk-facing-boundary film portion 21a is disposed at a distance from the terminals 18.

A fluoride compound or silane compound is suitable as a material for the low-surface-energy film 21. For example, the fluoride compound may be selected from the group consisting of: polytetrafluoroethylene, polyhexafluoropropylene, hexafluoropropylene, tetrafluoroethylene-perfluoroalkylvinylether copolymer, tetrafluoroethylene-hexafluoropropylene copolymer, tetrafluoroethylene-hexafluoropropylene-perfluoroalkylvinylether copolymer, tetrafluoroethylene-ethylene copolymer, perfluoropolyether compound, fluorine compound acrylic acid, fluorine compound methacrylate, trifluoromethane, hexafluoromethane, octafluoropropane, hexafluoropropane, hexafluoropropylene, or other fluorine gas having a carbon number of 1 to 10, xenon fluoride compound, or fluorine-containing alkylsilane compound. Moreover, for example, the silane compound may be selected from the group consisting of: vinyltrichlorosilane, vinyltrimethoxysilane, or other vinyl silane coupling agent, 3-glycidoxypropylmethyldiethoxysilane, 3-glycidoxypropyltrimethoxysilane, or other epoxy silane coupling agent, 3-methacryloxypropylmethyldimethoxysilane or other methacryloxy silane coupling agent, 3-aminopropyltrimethoxysilane, 3-aminopropyltriethoxysilane or other amino silane coupling agent, or styryl, acryloxy, ureido, chloropropyl, mercapto, sulfide, or isocyanate silane coupling agent.

The above-described low-surface-energy film 21 is deposited by a thin-film formation method, known in the art, such as: the dipping method, spray method, spin coat method, plasma processing method, ion beam method, or sputtering method.

Figure 4:
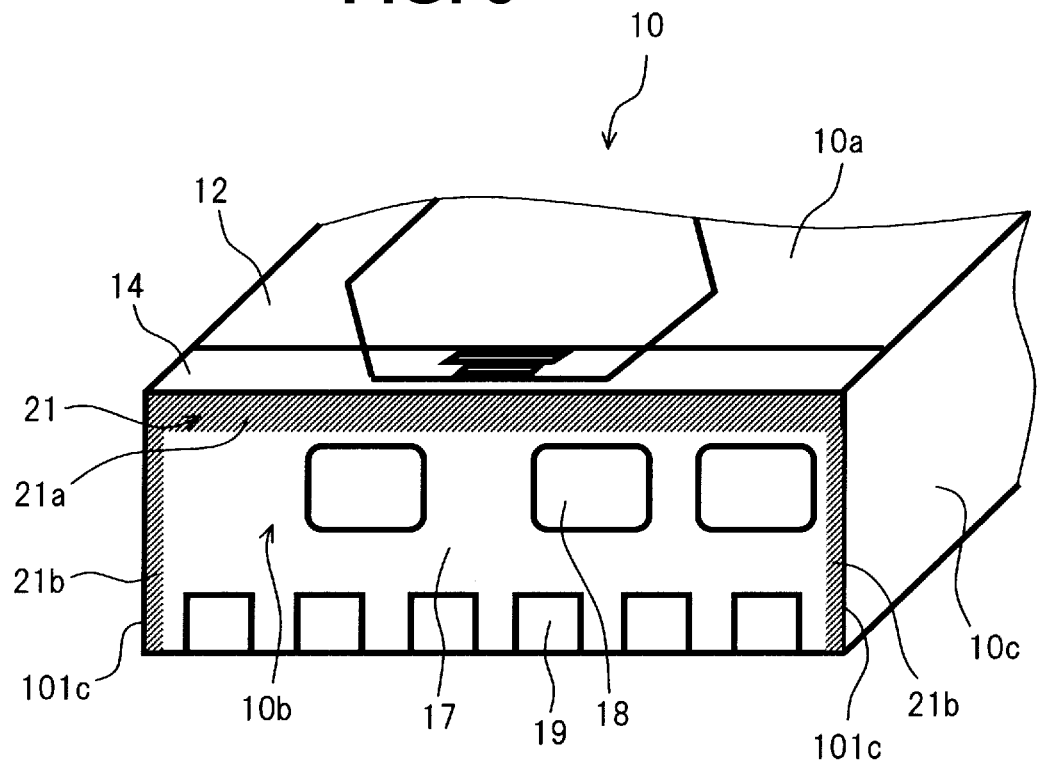
FIG. 4 is a perspective view of the trailing-edge side of the head slider illustrating disposition of the low-surface-energy film in the disk-facing-boundary film portion and a lateral-surface-boundary film portion, in accordance with an embodiment of the present invention.

With reference now to FIG. 4, in accordance with an embodiment of the present invention, a perspective view is shown of the trailing-edge side 10b of the head slider 10 that illustrates the disposition of the low-surface-energy film 21 in the disk-facing-boundary film portion 21a and a lateral-surface-boundary film portion 21b. Component elements identical with those of the embodiment described in the discussion of FIG. 3 are designated by the same reference numerals as their counterparts in FIG. 3. In the first modified embodiment shown in FIG. 4, a lateral-surface-boundary film portion 21b, which serves as the low-surface-energy film 21, is disposed on a marginal portion of the trailing-edge side 10b that is in contact with a boundary 101c between the trailing-edge side 10b and the lateral surface 10c. The lateral-surface-boundary film portion 21b is disposed at a distance from the terminals 18, 19. Thus, in accordance with embodiments of the present invention, the first modified embodiment shown in FIG. 4 inhibits lubricant attached to the lateral surface 10c from moving to the trailing-edge side 10b.

Figure 5:
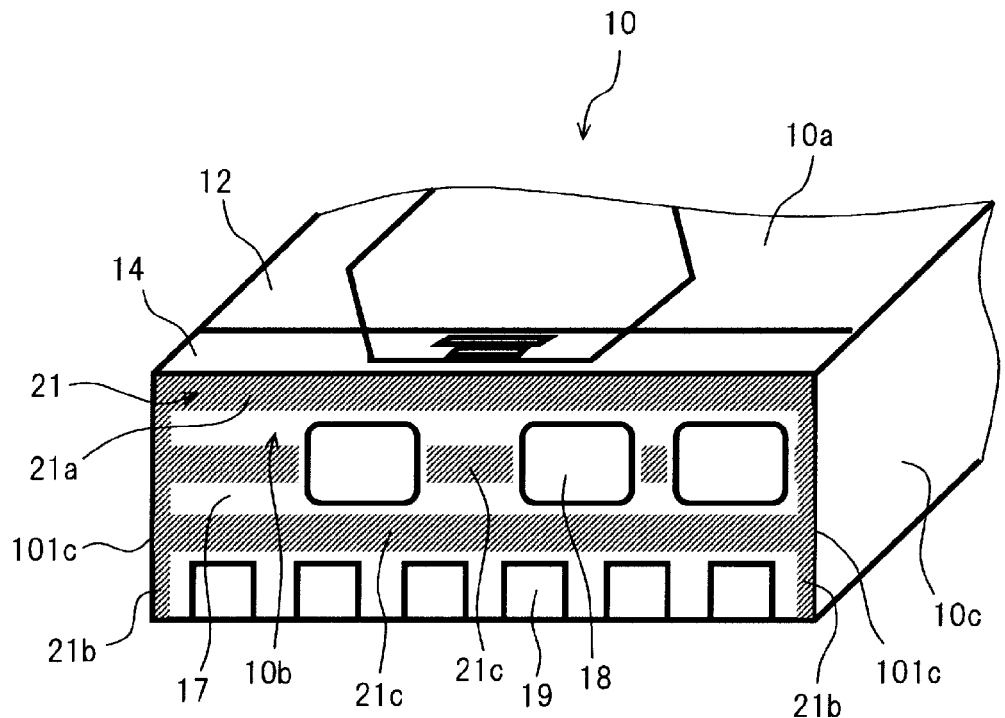
FIG. 5 is a perspective view of the trailing-edge side of the head slider illustrating disposition of the low-surface-energy film in the disk-facing-boundary film portion, the lateral-surface-boundary film portion and a horizontal-striped film portion, in accordance with an embodiment of the present invention.

With reference now to FIG. 5, in accordance with an embodiment of the present invention, a perspective view is shown of the trailing-edge side 10b of the head slider 10 that illustrates the disposition of the low-surface-energy film 21 in the disk-facing-boundary film portion 21a, the lateral-surface-boundary film portion 21b and a horizontal-striped film portion 21c. Component elements identical with those of the embodiments described in the discussions of FIGS. 3 and 4 are designated by the same reference numerals as their counterparts in FIGS. 3 and 4. In the second modified embodiment shown in FIG. 5, a plurality of horizontal striped film portions 21c, which are extended in the direction of the width of the head-slider 10 to serve as the low-surface-energy film 21, are disposed on the trailing-edge side 10b. The horizontal striped film portions 21c are disposed at a distance from the disk-facing-boundary film portion 21a and arranged in the direction of the thickness of the head-slider 10. The horizontal striped film portions 21c are disposed at a distance from the terminals 18, 19. According to the second modified embodiment shown in FIG. 5, the horizontal striped film portions 21c are arranged in the direction of the thickness so that the non-film portion 17 appears intermittently in the direction of the thickness of the head-slider 10. Therefore, the lubricant accumulated on the trailing-edge side 10b is dispersed in the direction of the thickness of the head-slider 10. Thus, in accordance with embodiments of the present invention, the second modified embodiment shown in FIG. 5 inhibits the lubricant from gathering in the thickness direction and dropping onto the magnetic-recording disk 2.

Figure 6:
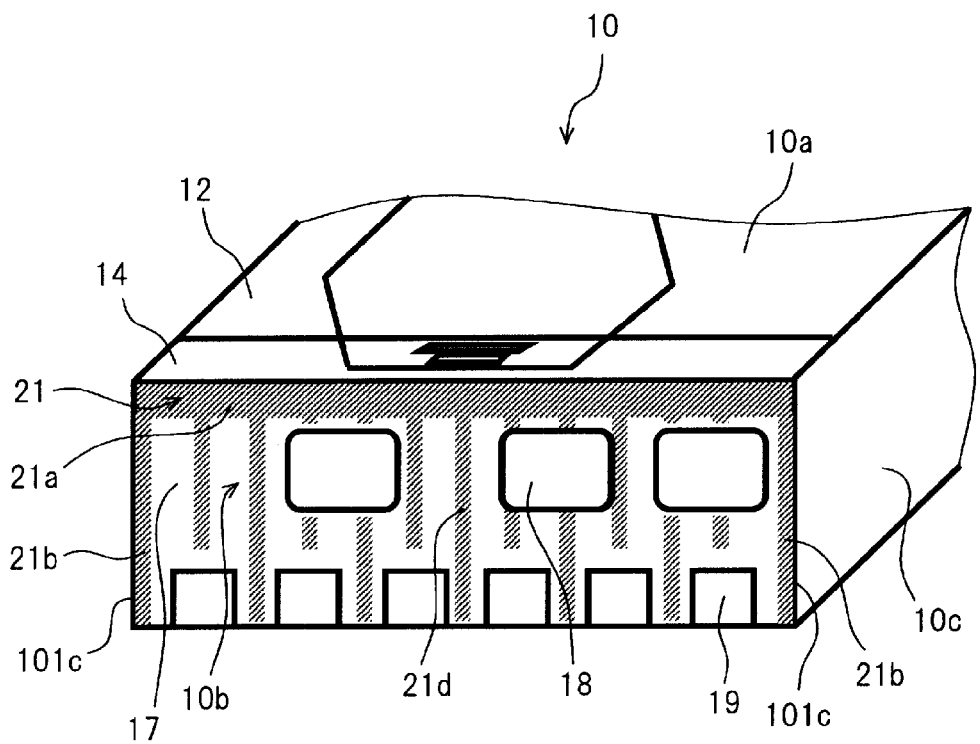
FIG. 6 is a perspective view of the trailing-edge side of the head slider illustrating disposition of the low-surface-energy film in the disk-facing-boundary film portion, the lateral-surface-boundary film portion and a vertical-striped film portion, in accordance with an embodiment of the present invention.

With reference now to FIG. 6, in accordance with an embodiment of the present invention, a perspective view is shown of the trailing-edge side 10b of the head slider 10 that illustrates the disposition of the low-surface-energy film 21 in the disk-facing-boundary film portion 21a, the lateral-surface-boundary film portion 21b and a vertical-striped film portion 21d. Component elements identical with those of the embodiments described in the discussions of FIGS. 3, 4 and 5 are designated by the same reference numerals as their counterparts in FIGS. 3, 4 and 5. In the third modified embodiment shown in FIG. 6, a plurality of vertical striped film portions 21d, which are extended in the direction of the thickness of the head-slider 10 to serve as the low-surface-energy film 21, are disposed on the trailing-edge side 10b. The vertical striped film portions 21d are disposed at a distance from the lateral-surface-boundary film portion 21b and arranged in the direction of the width of the head-slider 10. The vertical striped film portions 21c are disposed at a distance from the terminals 18, 19. According to the third modified embodiment shown in FIG. 6, the vertical striped film portions 21d are arranged in the direction of the width so that the non-film portion 17 appears intermittently in the direction of the width of the head-slider 10. Therefore, the lubricant accumulated on the trailing-edge side 10b is dispersed in the direction of the width. Thus, in accordance with embodiments of the present invention, the third modified embodiment shown in FIG. 6 will inhibit the lubricant from gathering in the width direction and dropping onto the magnetic-recording disk 2.

Figure 7:
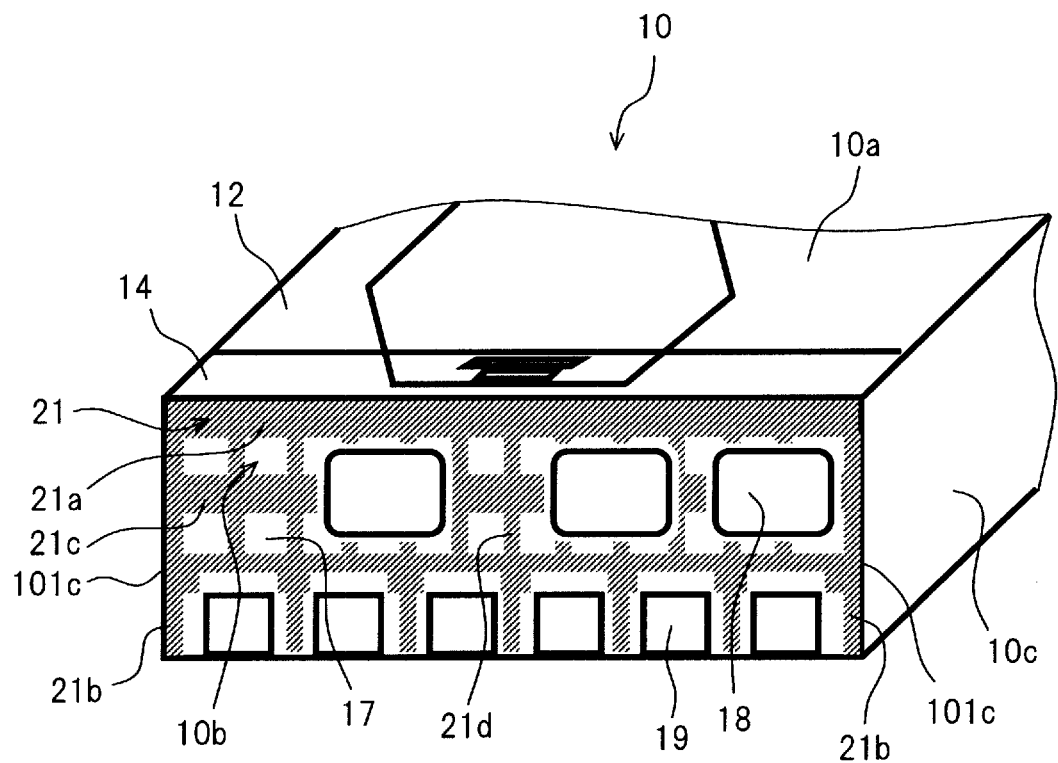
FIG. 7 is a perspective view of the trailing-edge side of the head slider illustrating disposition of the low-surface-energy film in the disk-facing-boundary film portion, the lateral-surface-boundary film portion and in a reticular pattern of both horizontal-striped and vertical-striped film portions, in accordance with an embodiment of the present invention.

With reference now to FIG. 7, in accordance with an embodiment of the present invention, a perspective view is shown of the trailing-edge side 10b of the head slider 10 that illustrates the disposition of the low-surface-energy film 21 in the disk-facing-boundary film portion 21a, the lateral-surface-boundary film portion 21b and in a reticular pattern of both horizontal-striped and vertical-striped film portions 21c and 21d. Component elements identical with those of the embodiments described in the discussions of FIGS. 3, 4, 5 and 6 are designated by the same reference numerals as their counterparts in FIGS. 3, 4, 5 and 6. In the fourth modified embodiment shown in FIG. 7, the horizontal striped film portions 21c described in connection with the second modified embodiment shown in FIG. 5 and the vertical striped film portions 21d described in connection with the third modified embodiment shown in FIG. 6 are disposed on the trailing-edge side 10b. Thus, the fourth modified embodiment shown in FIG. 7 is configured so that the low-surface-energy film 21 is disposed in a reticular pattern of both horizontal-striped and vertical-striped film portions 21c and 21d. Thus, in accordance with embodiments of the present invention, the fourth modified embodiment shown in FIG. 7 will further inhibit the lubricant from gathering and dropping onto the magnetic-recording disk 2.

While embodiments of the present invention have been described in terms of the specific examples described above, embodiments of the present invention are not limited to the above-described examples. In accordance with embodiments of the present invention, variations may be made without departure from the scope and spirit of embodiments of the present invention.

For example, the above-described examples assume that the low-surface-energy film 21 is disposed partially on the trailing-edge side 10b. However, embodiments of the present invention are not limited to such a configuration. A low-surface-energy film similar to the above-described low-surface-energy film may also be disposed on the disk-facing surface 10a.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider that is configured to receive an air-stream produced by rotation of a magnetic-recording disk, and that is configured to fly in proximity with a recording surface of said magnetic-recording disk, said head-slider comprising:

a trailing edge on an outflow side of said air-stream; and a disk-facing surface, said disk-facing surface configured to face said recording surface of said magnetic-recording disk;

wherein a low-surface-energy film is disposed in a pattern and only on a portion of a trailing-edge side of said head-slider that is in contact with a boundary between said trailing edge and said disk-facing surface, said low-surface-energy film having a lower surface energy than other portions of said trailing-edge side where said low-surface-energy film is not disposed.

2. The head-slider of claim 1, wherein said low-surface-energy film is disposed on a portion of said trailing-edge side that is in contact with a boundary between said trailing-edge side and a lateral surface of said head-slider.

3. The head-slider of claim 1, wherein said low-surface-energy film is disposed at a distance from a terminal mounted on said trailing-edge side.

4. The head-slider of claim 1, wherein said low-surface-energy film is disposed on a portion of said trailing-edge side that is disposed away from said boundary between said trailing-edge side and said disk-facing surface, and is extended in a width direction of said head-slider.

5. The head-slider of claim 1, wherein said low-surface-energy film is disposed on a portion of said trailing-edge side that is disposed away from a boundary between said trailing-edge side and a lateral surface of said head-slider, and is extended in a thickness direction of said head-slider.

6. The head-slider of claim 1, wherein said low-surface-energy film has a lower surface energy than said disk-facing surface of said head-slider.

7. The head-slider of claim 1, wherein said low-surface-energy film is made of a compound selected from the group consisting of a fluoride compound and a silane compound.

8. The head-slider of claim 1, further comprising:
a heater element for displacing a write element of a read-and-write elements of said head-slider toward said magnetic-recording disk.

9. A head-arm assembly comprising:
a suspension arm; and
a head-slider attached to said suspension arm, said head-slider configured to receive an air-stream produced by rotation of a magnetic-recording disk and configured to fly in proximity with a recording surface of said magnetic-recording disk, said head-slider comprising:
a trailing edge on an outflow side of said air-stream; and
a disk-facing surface, said disk-facing surface configured to face said recording surface of said magnetic-recording disk;
wherein a low-surface-energy film is disposed in a pattern and only on a portion of a trailing-edge side of said head-slider that is in contact with a boundary between said trailing edge and said disk-facing surface, said low-surface-energy film having a lower surface energy than other portions of said trailing-edge side where said low-surface-energy film is not disposed.

10. A hard-disk drive comprising:
a magnetic-recording disk; and
a head-arm assembly comprising:
a suspension arm; and
a head-slider attached to said suspension arm, said head-slider configured to receive an air-stream produced by rotation of said magnetic-recording disk and configured to fly in proximity with a recording surface of said magnetic-recording disk, said head-slider comprising:
a trailing edge on an outflow side of said air-stream; and
a disk-facing surface, said disk-facing surface configured to face said recording surface of said magnetic-recording disk;
wherein a low-surface-energy film is disposed in a pattern and only on a portion of a trailing-edge side of said head-slider that is in contact with a boundary between said trailing edge and said disk-facing surface, said low-surface-energy film having a lower surface energy than other portions of said trailing-edge side where said low-surface-energy film is not disposed.

11. The hard-disk drive of claim 10, further comprising:
a ramp for supporting said head-slider unloaded from said magnetic-recording disk.

* * * * *